United States Patent [19]

El-Hibri et al.

[11] Patent Number: 5,191,035

[45] Date of Patent: Mar. 2, 1993

[54] BLENDS OF POLYETHER SULFONES AND POLYIMIDES

[75] Inventors: M. Jamal El-Hibri, Roswell; James E. Harris, Buford, both of Ga.; John L. Melquist, Naperville, Ill.

[73] Assignee: Amoco Corporation, Chicago, Ill.

[21] Appl. No.: 768,009

[22] Filed: Sep. 30, 1991

[51] Int. Cl.$^5$ .................... C08L 77/00; C08L 77/06
[52] U.S. Cl. .................... 525/434; 525/436
[58] Field of Search ................ 525/436, 434

[56] References Cited

U.S. PATENT DOCUMENTS

| | | | |
|---|---|---|---|
| 3,658,938 | 4/1972 | Kwiatkowski et al. | 525/436 |
| 4,503,168 | 3/1985 | Hartsing, Jr. | 525/436 |
| 4,713,438 | 12/1987 | Harris et al. | 528/337 |
| 5,013,799 | 5/1991 | Giles, Jr. et al. | 525/436 |
| 5,036,146 | 7/1991 | Hedtmann-Rein et al. | 525/436 |
| 5,037,902 | 8/1991 | Harris et al. | 525/436 |
| 5,071,925 | 12/1991 | Rostami | 525/434 |
| 5,079,308 | 1/1992 | Harris et al. | 525/471 |

*Primary Examiner*—John C. Bleutge
*Assistant Examiner*—Helen F. Lee
*Attorney, Agent, or Firm*—Richard J. Schlott; Stephen L. Hensley; Frank J. Sroka

[57] ABSTRACT

Blends of a polyether sulfone and the polyimide of the dianhydride sulfonyl bis(phthalic anhydride) ("SPAN") and the diamine 1,4-bis(p-aminocumyl)benzene ("BAP"). The blends will comprise from about 10 to about 90 wt % polyether sulfone, preferably greater than about 50 wt % polyether sulfone, based on the total weights of polyether sulfone and polyimide. The blends exhibit good toughness and improved thermal performance over polyether sulfone alone while remaining readily processable, and have good mechanical properties including unexpectedly high stiffness as determined by high tensile modulus values. Blends of this invention also are surprisingly miscible, defined as exhibiting a single Tg value.

8 Claims, No Drawings

BLENDS OF POLYETHER SULFONES AND POLYIMIDES

BACKGROUND OF THE INVENTION

This invention relates to polyether sulfone resins and, more particularly, to blends comprising polyether sulfones and novel aromatic polyimides. The blends display excellent mechanical properties combined with high thermal stability, low water absorption and good melt-fabricability.

Aromatic polyimides have been known for over 30 years, and a variety of imide-containing polymers are readily available from commercial sources. Polyimides are generally recognized as excellent in heat resistance characteristics, but difficult to process. Though linear, polyimides do not behave as thermoplastics and melt-processing using injection molding or extrusion is difficult if not impossible for most members of this class of polymers. Fabrication of wholly aromatic polyimide molding powders may be accomplished in most instances only by sintering at high temperature and pressure, using techniques and procedures analogous to those used in powder metallurgy.

Solution processes such as dope casting also have very limited application to the processing of polyimides due to the characteristic insolubility of wholly aromatic polyimides. Where solution fabrication of polyimides is desired, such as for the production of coatings and film, the process generally carried out with the soluble polyamide-acid precursor, i.e., the form of the polymer prior to imidization. The subsequent step of thermally-inducing ring closure of polyamide-acids in the fabricated article to provide the polyimide is accompanied by evolution of water, making the fabrication of void-free articles extremely difficult and tedious.

Polyimides described as thermoplastic are also known including, for example, polyimides derived from 1,4-bis(p-aminocumyl) benzene, disclosed broadly in U.S. Pat. No. 4,681,928. Tetramethyl analogs of the polyimide are also known in the art. Such polyimides are described as soluble, having high glass transition temperatures and good mechanical and thermal properties.

Imide-based resins derived from diphenyl sulfone tetracarboxylic acid dianhydride, also called sulfonyl bis (phthalic anhydride) or "SPAN", are also known in the art, and are described in, for example, U.S. Pat. No. 3,422,061.

The polyimide having isopropylidene linkages have been described in the art and, more recently, blends of such polyimides with polysulfones, polyether sulfones and poly(aryl ether sulfones) have also been described, for example, in commonly assigned U.S. Pat. No. 5,037,902. The disclosure of the patent also includes polyimides derived from sulfonyl bis (phthalic anhydride) and 1,4-bis(p-aminocumyl) benzene.

Polyimides, including those described in the art as melt-processable, are known to exhibit some shortcomings. Seeking to overcome the deficiencies, the art has turned to consideration of blends comprising two or more thermoplastics. These efforts have resulted in identifying blends having a unique balance of properties not achievable by a single polymer, and such blends have found wide commercial application. Although blends of incompatible polymers may have utility for many uses, those comprising compatible and preferably miscible polymers generally exhibit more desirable mechanical properties, including less susceptibility to such problems as environmental stress cracking, and thus often find wider acceptance. Where such compatibility is lacking, the art has often sought additives to be included with the polymeric components to act as compatibilizing agents, enhancing compatibility of the polymeric components and in turn further improving important blend properties.

Compatibility and miscibility with other polymers, together termed "alloyability" are thus clearly considered by the art to be desirable polymer characteristics, and alloyability is capable of conferring a definite commercial advantage for such resins. In U.S. Pat. No. 5,037,902 there are described blends comprising poly(aryl ether sulfones) and certain polyimides derived from 1,4-bis(p-aminocumyl) benzene. According to the patent, only poly(aryl ether sulfones) comprising biphenyl units are generally miscible with polyimides derived from 1,4-bis(p-aminocumyl) benzene, and the presence of biphenyl units in the poly(aryl ether sulfone) unit is said to therefore be critical to attaining miscibility over a wide range. The patent defines miscibility as the presence of a single Tg for the blend, intermediate between the Tg values for the individual components, and recognizes that some combinations may be partially miscible, defined miscibility of the two resin components over less than the entire range of compositions. Resin formulations comprising these blends have good high temperature properties while remaining thermally processable. However, biphenyl-containing poly(aryl ether sulfone) resins are less readily available than many sulfone-containing resins, and may be more costly, factors that somewhat limit their commercial acceptance.

Polyether sulfone resins are readily available from commercial sources. These resins are typically more readily processable than the corresponding biphenyl-containing poly(aryl ether sulfone) resins and are substantially lower in cost, yet have the toughness and chemical resistance needed for use in a wide variety of applications. Although polyether sulfones have a high Tg of about 220° C., they may be somewhat lacking in high temperature properties, and their acceptability for use under more demanding environmental conditions may be somewhat limited as a result. A method for extending the range of temperatures in which polyether sulfones may be used could increase their acceptance for use in extreme environments, particularly where the chemical resistance of sulfone-containing polymers is needed. Compositions comprising polyether sulfones with improved strength and rigidity and useful over a widened temperature range while retaining the good processability of the polyether sulfones would clearly represent a useful advance in the art.

SUMMARY OF THE INVENTION

The compositions of this invention comprise blends of a polyether sulfone and the polyimide obtained from sulfonyl bis(phthalic anhydride) and 1,4-bis(p-aminocumyl) benzene. The compositions display a unique combination of excellent mechanical and thermal properties as well as good solubility and easy melt-fabricability; in addition, the resin components are compatible and many compositions were unexpectedly found to be miscible.

DETAILED DESCRIPTION OF THE INVENTION

The compositions of this invention are blends of a polyether sulfone resin and a polyimide. The blends will comprise from about 10 to about 90 wt % polyether sulfone, preferably from about 50 to about 90 wt % polyether sulfone, more preferably greater than 65 wt % polyether sulfone, based on the total weights of polyether sulfone and polyimide.

The polyether sulfone resins useful in forming the blends of this invention may be more particularly characterized and conveniently described as polyether sulfone polymers formed by the condensation polymerization of 4,4'-dichlorodiphenyl sulfone with 4,4'-dihydroxydiphenyl sulfone, optionally including additional dihydric phenols such as hydroquinone. These thermoplastic polymers and copolymers are readily molded and extruded, and have been widely accepted in the art for use in a great variety of commercial applications. Among the many such thermoplastics readily available from commercial sources are the VITREX® polyether sulfone resins from ICI, Ltd., the RADEL® A series of polyether sulfone resins from Amoco Performance Products, Inc. and thermoplastics supplied under the ULTRASON® mark by BASF. The preparation of these thermoplastic resins in well-described in the art.

The polyimide component of the blends of this invention may be conveniently described as the polyimide derived from the dianhydride sulfonyl bis(phthalic anhydride) ("SPAN") and the diamine 1,4-bis(p-aminocumyl) benzene ("BAP"). The polyimide may be prepared by any of the conventional methods ordinarily used in the production of aromatic polyimides. For example, the SPAN dianhydride may be combined and reacted with the diamine to produce a polyamide-acid, which may then be chemically or thermally dehydrated to form the polyimide.

The reaction of the dianhydride and diamine may be conveniently carried out in an inert liquid medium, i.e., a liquid that does not react with the polyamide-acid or any of the starting components to any appreciable extent. In addition to being inert, the liquid medium will preferably be a solvent for the polyamide-acid and must be a solvent for at least one, preferably all, of the reactants. Normally, liquid organic solvents of the N,N-dialkylcarboxylamide class, may be employed, including N,N-dimethylformamide and N,N-dimethylacetamide, N,N-diethylformamide, N,N-diethylacetamide, N,N-dimethylmethoxyacetamide, N-methyl caprolactam, and the like, as well as dimethylsulfoxide, N-methyl-2-pyrrolidone, tetramethyl urea, pyridine, dimethylsulfone, hexamethylphosphoramide, tetramethylene sulfone, formamide, N-methylformamide, butyrolactone and phenols such as m-cresol. Also very useful for the preparation of the polyimides of this invention are the diaryl sulfones and diaryl ketones such as diphenyl sulfone and benzophenone. The solvents may be used alone or as mixtures, and may be combined with poorer solvents and non-solvents such as benzene, benzonitrile, dioxane, xylene, toluene and cyclohexane.

The quantity of organic solvent used in the polymerization process may be only the amount needed to dissolve enough of one reactant, preferably the diamine, to initiate the reaction of the diamine and the dianhydride. However, the preferred process will employ sufficient solvent to provide a polymer solution having a solution viscosity within a practical range. Generally, the amount of solvent will be sufficient to provide a solution of polyamide-acid comprising from about 0.05 to about 40 wt % of the polymeric component.

The polymerization temperature is not particularly critical. Generally, it is possible to form the copolymers by conducting the reaction below 100° C.; however, temperatures up to 175° C. and even higher may be employed if desired. In order to obtain the maximum inherent viscosity, i.e., maximum degree of polymerization for any particular combination of diamine, dianhydride, solvent, etc., the optimum temperature throughout the polymerization will generally be found to be below 60° C., preferably below 50° C. Hence, the use of temperatures in the range of from about ambient temperature, i.e., about 15° C. to about 60° C. will be preferred.

The degree of polymerization of the polyamide-acid may desirably be controlled, either by employing an imbalance in the dianhydride-diamine stoichiometry or through use of chain terminating agents. Thus, equal molar quantities of dianhydride and diamine provide polyamide-acids of very high molecular weight, while use of either reactant in excess will limit the extent of polymerization. Addition of a chain terminating agent such as phthalic anhydride, to "cap" the ends of the polymer chains, will also limit the molecular weight and will often improve the thermal and oxidative stability of the final polyimide. Typical capping agents include monoanhydrides or monoamines such as phthalic anhydride, aniline, p-methylaniline and the napthyl analogs thereof, and monoisocyanates.

Although the polyamide-acid may be of any convenient molecular weight, extremely low molecular weight products generally exhibit poor mechanical properties. The inherent viscosity of the polyamide-acid, a recognized measurement reflective of molecular weight, will thus be at least 0.1 and preferably greater than about 0.3 dl/g when determined at 25° C. at a concentration of 0.5 percent by weight of the polymer in a suitable solvent such as N-methylpyrrolidone. Such polymers will generally give, on further processing, polyimides having useful mechanical properties. Even though polymers with extremely high molecular weights may be quite useful, solutions of such high molecular weight polyamide-acids become extremely high in viscosity, and processing becomes substantially more difficult. Therefore, as a practical matter, the inherent viscosity of the polyamide-acid will preferably be less than about 1.5 dl/g, and the inherent viscosity of the preferred polyamide-acids will thus lie in the range of from about 0.3 to about 1.5 dl/g.

To provide the polyimides according to the invention, the polyamide-acid will be converted to the polyimide in a subsequent reaction step, ordinarily by being treated with a dehydrating agent. The dehydrating agent may be a compound selected from acetic anhydride, lower fatty acid anhydrides such as propionic anhydride, butyric anhydride, valeric anhydride and the like, and aromatic monobasic acid anhydrides such as the anhydride of benzoic acid and the anhydrides of the toluic acids, the ethyl benzoic acids, propyl benzoic acid, isopropyl benzoic acid, anisic acid, the nitrobenzoic acids, the halogen-substituted benzoic acids, and the like.

The dehydration may be employed in combination with a tertiary amine, and particularly preferred is an acetic anhydride-pyridine mixture. Tertiary amines having approximately the same activity as the preferred pyridine that may be used in the process include isoquinoline, 3,4-lutidine, 3,5-lutidine, 4-methyl pyridine, methyl pyridine, 4-isopropyl pyridine, N,N-dimethyl benzyl amine, 4-benzyl pyridine and N,N-dimethyl dodecyl amine. These amines are generally used in a quantity of from about 0.3 mole to about 1.0 mole per mole of the anhydride converting agent. Trimethyl amine and triethylene diamines are much more reactive and will generally be used in still smaller amounts. Amines less reactive than pyridine such as 2-ethylpyridine, 2-methyl pyridine, triethyl amine, N-ethyl morpholine, N-methyl morpholine, diethyl cyclohexylamine, N,N-dimethyl cyclohexylamine, 4-benzoyl pyridine, 2,4-lutidine, 2,6-lutidine and 2,4,6-collidine may also be used, although generally in larger amounts.

An alternative method for converting the polyamide-acid to the polyimide is by thermal dehydration, generally in bulk and preferably in the form of a shaped article, e.g., film or filament comprising the polyamide-acid. To remove minor amounts of solvent and the moisture produced in the reaction and thus reduce or prevent foaming and the formation of voids, the dehydration will be preferably conducted in a step-wise manner and in an inert gas atmosphere, starting by heating at a temperature of about 100° C. and increasing the temperature progressively to about 300° C. or even higher.

Other useful reaction catalysts for the imidization of the polyamide-acid are the metal acetylacetonates which are described in, for example, U.S. Pat. No. 4,421,905. The acetylacetonate-promoted reaction is advantageously conducted at a temperature in the range of about 70° C. to 150° C., preferably in the range of about 100° C. to 140° C. When the temperature is in the upper portion of these ranges, the imidization reaction is substantially completed in 2 to 4 hours. The metal acetylacetonate is advantageously used in an amount of at least 0.005 gram, preferably at least 0.01 gram per equivalent weight of dianhydride and generally there is no need to exceed 1 gram of metal acetylacetonate to obtain the desired results. Advantageously, the metal acetylacetonate is used in an amount of 0.005 to 1 gram of metal acetylacetonate, preferably 0.01 to 0.005 gram per gram of aromatic dianhydride.

An alternative and well-known process suitable for producing polyimides, including the polyimide of this invention, has the advantage of being carried out in a single reaction step, thereby avoiding the production of an intermediate polyamide-acid. The process, accomplished through reaction of the dianhydride with the diisocyanate analog of the diamine, is carried out under substantially anhydrous conditions. The progress of the reaction can be followed by any of the routine analytical techniques such as following the viscosity increase of the reaction solution or the evolution of carbon dioxide. Inasmuch as the polyimides of this invention are soluble, when produced by the reaction of the dianhydride with diisocyanate and employing a suitable solvent, they remain in solution and can be used as such. In the alternative, they may be precipitated by addition of an appropriate liquid in which the polyimide is insoluble or has low solubility.

The polyether sulfone and polyimide components of the blends of this invention are generally compatible and, surprisingly may be miscible over a limited range of proportions.

As taught by U.S. Pat. No. 5,037,902, blends of biphenyl-containing poly(aryl ether sulfone) resins and polyimides having an isopropylidene moiety are compatible and generally miscible in all proportions, while polyether sulfone resins without such biphenyl units are stated to be immiscible or only partially miscible at best. Miscibility is defined by the patent as the presence of a single Tg for the blend.

As will be further demonstrated by the examples presented herein below, blends comprising SPAN-BAP polyimide and polyether sulfone resins without biphenyl units surprisingly exhibit only a single Tg; according to the description set forth in U.S. Pat. No. 5,037,902 these blends are considered to be miscible. Other blends may be partially miscible, defined as the presence of a single Tg over less than the entire range of composition ratios for the two components.

By partial miscibility is meant that the blends are not miscible and do not exhibit a single Tg over the entire range of possible compositions. Partially miscible blends form compositions characterized by the presence of two ordinarily compatible phases, each phase comprising a solution of the two resin components in a weight ratio that will be miscible. The existence of two blend phases may often be demonstrated by the presence of two Tg's, each ordinarily lying within the temperature range between the Tg's for the neat resin components. However, the two blend phases may have similar Tg values. Detection then becomes more difficult and other indices of partial miscibility are relied upon, such as the presence of haze, or a single Tg that remains essentially unvarying over a wide range of composition variation.

Partially miscible blends differ from blends that are completely immiscible in that such completely immiscible blends will also generally comprise two phases, with each phase ordinarily containing a single resin component. The two Tg's exhibited by a substantially immiscible blend will lie at or near the Tg values for the individual components. Further, for completely immiscible blends, the two phases present are often incompatible as well, becoming physically separated during fabrication or when placed under slight stress and causing delamination and consequent disintegration of articles molded or extruded from such incompatible components.

Compositions comprised of polyether sulfone with SPAN-BAP polyimide, even though partially miscible or even immiscible, may also have an important and useful balance of mechanical properties. Even when partially miscible, such blends have good rigidity and improved impact properties, and are more processable than the neat polyimides. However, inasmuch as miscible, transparent blends are generally considered by the art to be more desirable for many applications, blends within the miscible range will be most preferred.

The blends may be formed by any of the conventional methods known to those skilled in the resin compounding art for producing blends of thermoplastic resins, including solution blending, dry blending or milling followed by melt processing, extrusion compounding and the like. As an alternative to such processes, copolymerization of the polyimide monomer components, either in a solvent or in the melt, may be carried out in the presence of the polyether sulfone, thereby providing an intimate blend of the resin components. There have been recently described, for example in U.S. Pat. No. 5,037,902, processes whereby the polyimide is formed during thermal processing of the reaction mixture in an extruder or similar device. The process, termed reactive extrusion compounding, is carried out by feeding a mixture of the dianhydride, the diamines and the poly(aryl ether sulfone) to a compounding extruder. In the alternative, the poly(aryl ether sulfone) may be first plasticated at a temperature in the range of 200° C. to 400° C., followed by addition of the monomers. Such processes may provide significant economic advantages including avoiding the cost of solvent recovery by eliminating the use of solvents.

Those skilled in the resin compounding art will be well aware of these and a great many other methods and processes for manufacture of such blends. Any of the methods for blending thermoplastics well known in the art may thus be conveniently employed for the manufacture of the blend compositions of this invention.

The invention will be better understood by consideration of the following examples, which are provided by way of illustration and not in limitation thereof.

EXAMPLES

The following are the materials, abbreviations and test procedures employed in the Examples.

Monomers

The following dianhydride and the diamine monomers are well known in the art, and are readily obtained from a variety of commercial sources.

SPAN: Sulfonyl bis(phthalic anhydride), a dianhydride having the structure:

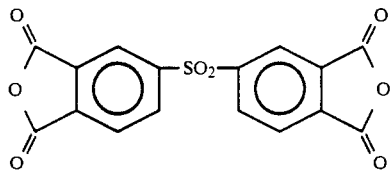

BAP: 1,4-bis(p-aminocumyl) benzene, commonly referred to as bisaniline P:

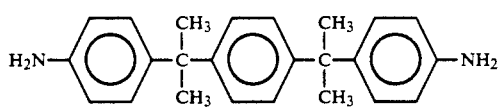

Polyether Sulfones

The polyether sulfones used in the examples that follow have been given the designations PES and PES-III, described as follows:

PES: A polyether sulfone polymer of 4,4'-dihydroxydiphenyl sulfone with 4,4'-dichlorodiphenyl sulfone having a reduced viscosity and molecular weight values substantially equivalent with those of PES-III. Obtained as VICTREX® 4100 G thermoplastic from Imperial Chemical Industries, PLC.

PES-III: A copolymer of 4,4'-dihydroxydiphenyl sulfone and hydroquinone, in a molar ratio of 3/1, with 4,4'-dichlorodiphenyl sulfone having a reduced viscosity in N-methylpyrrolidone (NMP) at a concentration of 0.2 g/dl and 25° C. of about 0.50 dl/g.

Test Methods

I.V. Polyimide inherent viscosities (I.V.) were measured at 30° C. as 0.5 g/dl solutions in NMP using a Cannon-Fenske viscometer.

Tg The following methods were used for determining glass transition temperatures (Tg):

(1) DSC, or differential scanning calorimetry, conducted at a heating rate of 20° C./min using a DuPont Model 910 thermal analyzer controlled by an Omnitherm Advantage II controlling system. Tg was measured during the second heat after quench of the first heat, and is defined from the onset of the change in heat capacity.

(2) DMTA, or dynamic mechanical thermal analysis, conducted using a Polymer Laboratories tensile unit by employing a sinusoidal tensile force at a frequency of 1 Hz and a heating rate of 3° C./min. Tg is defined as the maximum in loss tangent (tan δ), determined by the ratio of the dynamic loss modulus (E") to that of the storage modulus (E').

The DMTA Tg measurement technique boasts excellent sensitivity to polymer phase transitions and thus allows detection of miscibility or partial miscibility between two or more polymers in a blend. Typically, Tg values obtained by DMTA are higher than those determined by DSC, by about 10° C.

The term miscibility, when used herein to characterize a polymer blend, means a polymer blend charaterized by the presence of a single Tg intermediate to those of the constituent components. Since the Tg of the polyimides of this invention are at least 50° C. higher than those of the polyether sulfone, miscibility could be judged based on this technique almost unequivocally.

Clarity in a compression-molded specimen of a resin blend gives additional supporting evidence that the blend is miscible. However, inasmuch as clarity of a blend is possible also when polymer phases in the blend possess the same or very close refractive indices, clarity alone is not considered sufficient.

Tensile properties were measured substantially according to ASTM-D638. The nominal gauge dimensions of the specimens tested were 2" length×0.125" width×0.02" thickness. Tensile modulus was measured as the 1% secant modulus value, calculated on the basis of crosshead travel.

The pendulum impact test used is substantially analogous to the Charpy impact test procedure. The impact strength was determined using 0.125" wide strips of the compression molded samples clamped between the grips of a pendulum impact tester placed at a distance of 1" apart. Briefly described: The pendulum is cylindrical, with a diameter of 0.83 inches and weighing 1.562 lbs; the striking piece, mounted essentially at the free end of the pendulum, is a cylinder 0.3" in diameter; film specimens 4" long, 0.125" wide and about 1-30 mils thick are clamped between the jaws of the tester so that the jaws are spaced 1" apart; the 0.125" width of the film is mounted transversely exactly beneath the axis of rotation of the pendulum; the pendulum is raised to a constant height to deliver 1.13 ft.lbs at the specimen. When the pendulum is released, the cylindrical striking piece hits the specimen, breaks the film and travels to a measured height beyond the specimen. The difference in the recovery height (i.e. the difference in the potential energy of the pendulum at the maximum point of the upswing) represents the energy absorbed by the specimen during rupture; the impact strength, expressed in ft-lbs/in$^3$ is obtained by dividing the pendulum energy loss by the volume of the specimen, typically 0.0025 in$^3$.

PREPARATION OF POLYIMIDES

Example 1: Polyimide from SPAN and BAP

A polyimide was prepared from SPAN and BAP, using phthalic anhydride (PA) as the endcapping agent, as follows. BAP diamine, 63.16 g (0.183 mole) was weighed into a 1 l resin kettle. The kettle was immersed in an oil bath at 40° C., purged with nitrogen for 35 min, and then about 450 ml of warmed N-methylpyrrolidone [NMP] were added and the contents were stirred. After the diamines dissolved, 65.22 g SPAN (0.182 mole) were weighed into a powder addition funnel and added to the kettle slowly over a 27 min period. About 50 ml of NMP were used to flush the SPAN residue from the addition funnel into the kettle. After the addition of SPAN was completed, the solution was stirred for 3 hrs and 25 min, then 0.54 g PA (0.0036 mole) were added and an aliquot of the polyamide-acid solution was removed for inherent viscosity determination.

After stirring an additional 1 hr and 50 min, 38.62 ml pyridine and 38.62 ml acetic anhydride (0.409 mole) were added to imidize the polyamide-acid, and stirring was continued overnight. A sample was removed and used to determine the inherent viscosity of the polyimide before the reaction mixture was poured into water to precipitate the polyimide. The polyimide had an I.V.=0.47 dl/g.

The collected solids were washed in water and dried at least 16 hrs (overnight) under vacuum using a steam-heated vacuum oven operating at about 100° C. and a vacuum level of 28-29 inches Hg. Test specimens were prepared from vacuum dried polyimide powder by compression molding at 380° C., providing 0.020" in thick plaques which then were shear cut into 0.125" wide strips.

BLENDS

The blends of this invention are uniquely compatible compositions comprising SPAN-BAP polyimide and polyether sulfone resins. The following examples illustrate the preparation and properties of some of the unique blends comprising SPAN-BAP polyimide according to the present invention.

Example 2

The components were first dried at least 16 hrs (overnight) under vacuum using a steam-heated vacuum oven operating at about 100° C. and a vacuum level of 28-29 inches Hg. A 50:50 by weight mixture of polyether sulfone and the polyimide was prepared by dry-blending PES pellets with an equal weight of the powdered polyimide of Example 1, then melt-blending approximately 30 g of the mixture in a small twin-blade Brabender mixing bowl at a temperature of 380° C. and a rotational mixing blade speed of 50 rpm. The resin mixture was fluxed for 5 min, after which the blend was removed and placed again into a vacuum oven at 100° C. for additional overnight drying. The blend sample was then compression molded using standard compression molding practice into a 4"×4"×0.020" mold cavity using a Hydrolair hydraulic press heated to 380° C. The resulting plaque was next shear-cut into 0.125" wide strips to provide specimens for testing.

The mechanical properties, Tg values and compositions are summarized in Table I.

Examples 3-7

Additional blends of SPAN-BAP and polyether sulfone resins were prepared and molded substantially as in the Example 2. The compositions, Tg values and mechanical properties are summarized in Table I.

Comparison Examples

Powder samples of the SPAN-BAP polyimide of Example 1 were dried overnight in a vacuum oven, then compression molded at 380° C. to provide 4"×4"×0.020" plaques.

Samples of pellets from each of the PES resins used in the blends of Examples 2-7 were similarly compression molded at 360° C.

The properties of Comparison Examples A and B are summarized in the following Table I.

TABLE I

| Example No. | | A | B | 3 | 2 | 4 | 5 | 6 | 7 | 1 |
|---|---|---|---|---|---|---|---|---|---|---|
| PES | pbw | — | 100 | 65 | 50 | — | — | — | — | — |
| PES-III | pbw | 100 | — | — | — | 80 | 70 | 65 | 50 | — |
| Polyimide | pbw | — | — | 35 | 50 | 20 | 30 | 35 | 50 | 100 |
| DMTA Tg | (°C.) | 225 | 230 | 240 | 242 | 235 | 238 | 238 | 241 | 291 |
| T. Mod | Kpsi | 255 | 265 | 285 | 283 | 272 | 279 | 287 | 297 | 271 |
| T. Str. | Kpsi | 11.8 | 12.7 | 10.8 | 11.6 | 12.5 | 12.2 | 11.7 | 13.2 | 14 |
| El. | % | 55 | 26 | 4.7 | 6 | 7.7 | 6.4 | 5.3 | 7.4 | 10 |
| Pend. Impact | ft-lb/in$^3$ | 97 | 95 | 10 | 19 | 55 | 36 | 28 | 33 | 11 |

Notes:
Abbreviations, compositions, see text. Compositions are in parts-by-weight (pbw);
DMTA Tg = glass transition temperature determined by dynamic mechanical thermal analysis, see text.
T. Mod. = tensile modulus;
T. Str. = tensile strength;
El. = elongation at break;
Pend. Impact = pendulum impact.
Tensile properties are at room temperature; see text.

The blends of this invention will be seen to be improved in stiffness over either of the resin components alone, as shown by the increased tensile modulus values for Examples 2-7. The Tg values of the blends are improved compared with those of the polyether sulfone resins alone, yet the blends remain processable by injection molding. The addition of SPAN-BAP polyimide to polyether sulfone resins thus improves stiffness and thermal performance without rendering them unprocessable or exceptionally brittle.

The blends of Examples 2-7, having in each instance a single Tg value, are miscible within the definition set forth in U.S. Pat. No. 5,037,902. However, the 50:50 blends of Examples 2 and 7 may only be partially miscible, as shown by a lack of correlation between Tg value and the proportion of the two resin components, as well as the increase in impact properties compared with the values for the 65:35 blends, which will be understood to be a characteristic of blends comprised of two compatible phases.

As taught by U.S. Pat. No. 5,037,902, only immiscible compositions are formed by blending polyether sulfone resins with closely related polyimides, as shown by the blend comprising PES and the polyimide formed from the dianhydride IPAN or bis(4-phthalic anhydride)-1-methylethylidene with BAP or by the blend comprising polyether sulfone with the polyimide formed from BPTDA or 3,3',4,4'-biphenyl tetracarboxylic acid dianhydride and BAP, both of which are immiscible. The miscibility of blends comprising the SPAN-BAP polyimide and polyether sulfone resins is thus surprising and clearly unexpected.

The blends of this invention are thermoplastic, and soluble, and therefore may be used as thermoplastics in producing molded and extruded goods. They may be fabricated into any desired shape, including molded articles such as gears, bearings, and the like, and may be used as films or the form of coatings, fibers and the like.

It will be recognized that the blends of this invention may be combined with conventional additives and fillers, such as, for example, mineral fillers such as chalk, calcite, dolomite and the like; silicates including mica, talc, wollastonite; silicon dioxide; glass in the form of beads, spheres, flakes, powders and the like; as well as such fillers as aluminum powders and flakes, clays, quartz, and the like, according to methods and processes well known in the art. When combined with reinforcing fibers, either in chopped or continuous form, including fiberglass, carbon fibers and filaments, high temperature resin filaments such as Kevlar filaments, pulp and flock and the like may be used, the blends may also be for the production of filled compositions, composite and laminates. Other conventional additives employed in the art such as pigments, thermal stabilizers, ultraviolet light stabilizers, plasticizers and the like, may also be employed.

Comparison Example C

A 50:50 blend comprising the polyimide of Example 1 and UDEL ® polysulfone, a polymer of bisphenol A and 4,4'-dichlorodiphenyl sulfone obtained from Amoco Performance Products, Inc., was prepared substantially by the process of Example 2. The blend was extremely brittle, an indication of incompatibility of the blend components, and determination of the mechanical properties was not possible.

The invention will thus be understood to be a composition comprising a polyether sulfone resin and a polyimide wherein the polyimide is a polymer of the dianhydride sulfonyl bis(phthalic anhydride) ("SPAN") and the diamine 1,4-bis(p-aminocumyl) benzene ("BAP"). The composition will comprise from about 10 to about 90 wt %, preferably greater than about 50 wt %, more preferably greater than about 65 wt %, still more preferably greater than about 70 wt % of said polyether sulfone, based on the combined weight of polyimide and polyether sulfone. Miscible blends comprising from about 65 wt % to about 90 wt % will be most preferred. The polyether sulfone component may be an ether sulfone polymer of 4,4'-dichlorodiphenyl sulfone and at least one diphenol selected from hydroquinone and 4,4'-dihydroxydiphenyl sulfone. The blends of this invention are particularly useful as melt- and solution-processable blends with an attractive balance of physical properties suitable for a wide variety of uses.

Further modifications and variations will become readily apparent, and it will be readily understood by those skilled in the polymer arts that although the polymer components including polyether sulfones and polyimides are described in terms of monomers employed in their preparation by conventional methods, alternative processes and monomers may be employed to provide polymers and copolymers having the same or equivalent structures, and such blends are also contemplated as within the scope of this invention. These and other variations and modifications will be understood and recognized by those skilled in the thermoplastic resin and resin compounding arts to be fully within the ambit of the invention set forth and described herein, the scope thereof being defined solely by the claims appended hereto.

We claim:

1. A composition comprising a blend of polyether sulfone and the polyimide of sulfonyl bis(phthalic anhydride) and 1,4-bis(p-aminocymyl)benzene, wherein said polyether sulfone does not contain a biphenyl unit.

2. The composition of claim 1 comprising greater than about 50 wt % of said polyether sulfone based on combined weights of polyether sulfone and polyimide.

3. The composition of claim 1 comprising from about 65 wt % to about 90 wt % of said polyether sulfone, based on combined weights of polyether sulfone and polyimide.

4. The composition of claim 1 comprising from about 70 wt % to about 90 wt % of said polyether sulfone, based on combined weights of polyether sulfone and polyimide.

5. A composition comprising a blend of from about 65 wt % to about 90 wt % of (a) an ether sulfone polymer of 4,4'-dichlorodiphenyl sulfone and at least one dihydric phenol selected from hydroquinone and 4,4'-dihydroxydiphenyl sulfone and, correspondingly, from about 35 wt % to about 10 wt % of (b) the polyimide of sulfonyl bis(phthalic anhydride) and 1,4-bis(p-aminocumyl) benzene, wherein said ether sulfone polymer does not contain a biphenyl unit.

6. The composition of claim 5 comprising from about 70 wt % to about 90 wt % of component (a) and from about 30 wt % to about 10 wt % of component (b).

7. The composition of claim 5 wherein component (a) is an ether sulfone polymer of 4,4'-dichlorodiphenyl sulfone and 4,4'-dihydroxydiphenyl sulfone.

8. The composition of claim 5 wherein component (a) is an ether sulfone polymer of 4,4'-dichlorodiphenyl sulfone, hydroquinone and 4,4'-dihydroxydiphenyl sulfone.

* * * * *

UNITED STATES PATENT AND TRADEMARK OFFICE
CERTIFICATE OF CORRECTION

PATENT NO. : 5,191,035
DATED : March 2, 1993
INVENTOR(S) : EL-Hibri, M. JAMAL: HARRIS, JAMES E; MELQUIST, JOHN L.

It is certified that error appears in the above-indentified patent and that said Letters Patent is hereby corrected as shown below:

| Col. | Line | |
|---|---|---|
| 12 | 27 | "1.4-bis(p-aminocymyl)" should read --1,4-bis(p-aminocumyl)--. |

Signed and Sealed this

Eighth Day of February, 1994

Attest:

BRUCE LEHMAN

Attesting Officer

Commissioner of Patents and Trademarks